(12) United States Patent
Hsu et al.

(10) Patent No.: US 7,878,656 B2
(45) Date of Patent: Feb. 1, 2011

(54) STEREO PROJECTION OPTICAL SYSTEM

(75) Inventors: Chien-Wen Hsu, Taipei Hsien (TW); Chia-Hung Kao, Taipei Hsien (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 570 days.

(21) Appl. No.: 11/952,977

(22) Filed: Dec. 7, 2007

(65) Prior Publication Data

US 2009/0059172 A1    Mar. 5, 2009

(30) Foreign Application Priority Data

Aug. 28, 2007    (CN) .................... 2007 1 0201502

(51) Int. Cl.
    *G03B 21/14*    (2006.01)

(52) U.S. Cl. .................. 353/20; 353/7; 353/8; 353/34; 353/84; 353/102; 348/750; 348/751; 348/756; 348/744; 348/766; 348/790; 348/804; 359/237; 359/242; 359/246; 359/263; 359/267; 359/275; 359/303; 359/318; 349/5; 349/7; 349/8; 349/9

(58) Field of Classification Search .................... 353/7, 353/8, 20, 84, 34, 102; 348/751, 750, 756, 348/744, 766, 790, 804; 359/237, 242, 246, 359/263, 267, 275, 303, 318; 349/5, 7, 8, 349/9

See application file for complete search history.

(56) References Cited

U.S. PATENT DOCUMENTS

| | | | |
|---|---|---|---|
| 5,815,221 A * | 9/1998 | Kojima et al. ................ 348/751 |
| 6,280,034 B1 * | 8/2001 | Brennesholtz ................ 353/20 |
| 6,522,351 B1 | 2/2003 | Park | |
| 7,686,453 B2 * | 3/2010 | Bruzzone ..................... 353/20 |
| 2002/0118375 A1 * | 8/2002 | Ramanujan et al. .......... 358/1.2 |
| 2003/0020809 A1 * | 1/2003 | Gibbon et al. ................ 348/51 |
| 2003/0164901 A1 * | 9/2003 | Ouchi et al. ................ 348/744 |
| 2006/0215129 A1 * | 9/2006 | Alasaarela et al. ........... 353/94 |
| 2007/0146880 A1 * | 6/2007 | Bleha et al. ................. 359/468 |
| 2007/0296921 A1 * | 12/2007 | Wang et al. .................. 353/20 |
| 2009/0141242 A1 * | 6/2009 | Silverstein et al. ........... 353/20 |

FOREIGN PATENT DOCUMENTS

CN         1742227 A        3/2006

* cited by examiner

*Primary Examiner*—Georgia Y Epps
*Assistant Examiner*—Sultan Chowdhury
(74) *Attorney, Agent, or Firm*—Jeffrey T. Knapp

(57) ABSTRACT

A stereo projection optical system includes a first polarizing beam splitter, a transmission-type light modulator positioned to receive the first polarized light component from the first polarizing light splitter and an image assimilator positioned to receive an emergent light of the transmission-type light modulator. The image assimilator includes a second polarized light splitter and first, second reflective spatial light modulators. The stereo projection optical systems provide viewers three-dimensional images formed by two alternative polarization light beams whose polarizations are perpendicular to each other utilizing the transmission-type light modulators to form "3-D" images.

10 Claims, 6 Drawing Sheets

STEREO PROJECTION OPTICAL SYSTEM

CROSS REFERENCE TO RELATED APPLICATION

This application is related to a co-pending U.S. patent application Ser. No. 11/947,086, entitled "STEREO PROJECTION OPTICAL SYSTEM", which was filed on Nov. 29, 2007 and is assigned to the same assignee as the present application. The disclosure of the above-identified application is incorporated herein by reference.

RELATED FIELD

The present invention relates generally to projection optical systems, and more specifically to a stereo projection optical system.

BACKGROUND

Various types of stereoscopic projection optical systems are well known in the art. Such stereoscopic projection optical system includes two projectors arranged in parallel so that image from a liquid crystal display (LCD) panel or a slide film is projected on a screen by each light source. As shown in FIG. 4, one of such stereoscopic projection optical systems includes spherical reflective mirrors 1, 1', lamps 2, 2', condenser members 3, 3', LCD panels 4, 4', and projecting lenses 5, 5'.

In the stereoscopic projection optical system of FIG. 4, the stereoscopic picture is obtained by making the polarizing directions of projected beams perpendicular to each other by using two projectors, and then the picture from a right projector is visible only to right eye of a viewer and the picture from a left projector is visible only to left eye of the viewer, respectively.

In the conventional projection optical system, the lamps 2, 2' are independently operated and when the beams from the lamps 2, 2' pass through the LCD panels 4, 4', the beams are polarized in the direction of a polarizing axis of polarizing plates of the LCD panels 4, 4'. At this time, a half of the beams condensed by the condenser members 3, 3' is decreased before having passed through the LCD panels 4, 4' by one polarizing plate which is located at the light source side. A loss of light occurs due to a part of light being absorbed as a heat to the polarizing plate of the LCD panels 4, 4', thereby necessitating a separate cooling device to increase the cooling efficiency at the LCD panels 4, 4'.

It is desired to provide a stereo projection optical system which can overcome the above-described deficiencies.

SUMMARY

In accordance with a present embodiment, a stereo projection optical system, includes a first polarizing beam splitter, a transmission-type light modulator positioned to receive an incident light from the first polarizing light splitter and an image assimilator positioned to receive an emergent light of the transmission-type light modulator. The first polarizing beam splitter is configured for splitting an incident light beam into a first polarized light component and a second polarized light component which is substantially orthogonal to the first polarized light component. The transmission-type light modulator switchably operates between a dark state and a bright state. When the transmission-type light modulator is in the dark, it transmits the first polarized component. When the transmission-type light modulator is in the bright, it converts the first polarized light component into the second polarized light component and emits the second polarized light component. The image assimilator includes a second polarized light splitter and first, second reflective spatial light modulators. The first polarized light component output from the transmission-type light modulator in the bright state passes through the second polarizing beam splitter and reaches the first reflective spatial light modulator. The first reflective spatial light modulator is configured for converting the first polarized light component into the second polarized light component and superimposing spatial information on the second polarized light component and emitting the second polarized light component. The second polarized light component output from the transmission-type light modulator in the dark state passes through the second polarizing beam splitter and reaches the second reflective spatial light modulator. The second reflective spatial light modulator is configured for converting the second polarized light component into the first polarized light component and superimposing spatial information on the first polarized light component and emitting the first polarized light component.

Other novel features and advantages will become more apparent from the following detailed description when taken in conjunction with the accompanying drawings.

BRIEF DESCRIPTION OF THE DRAWINGS

A present invention is described in detail hereinafter, by way of example and description of preferred and exemplary embodiments thereof and with reference to the accompanying drawings, in which.

DETAILED DESCRIPTION OF THE PREFERRED EMBODIMENTS

A detailed explanation of a stereo projection optical system for projection displays according to each of various embodiments of the present invention will now be made with reference to the drawings attached hereto.

Figure 1:
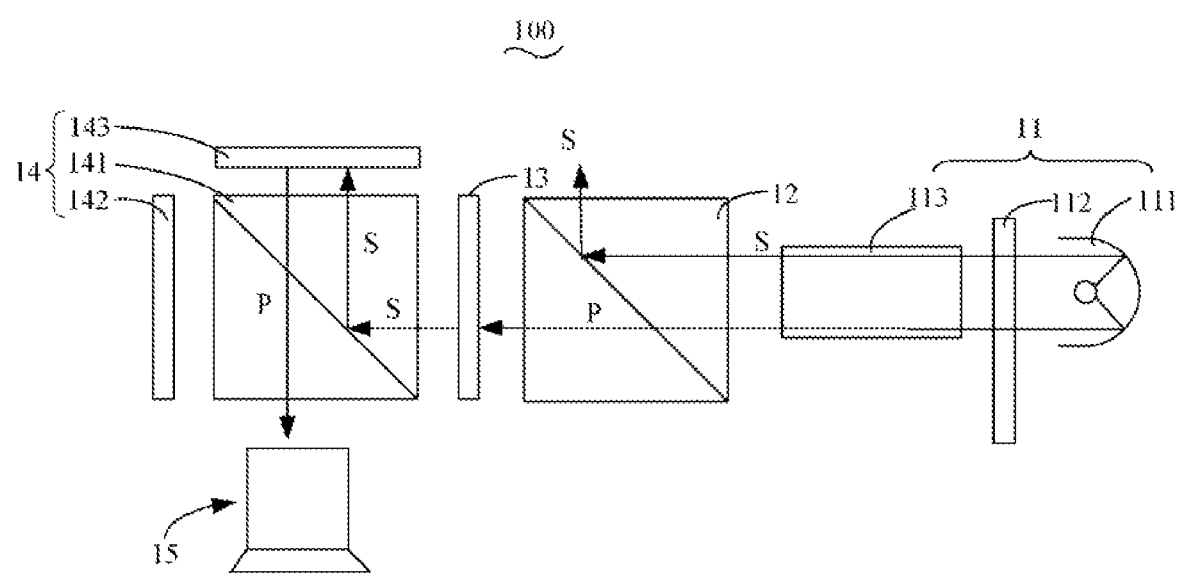
FIG. 1 is a schematic view of a configuration of a stereo projection optical system in accordance with a first embodiment of the present invention, wherein a transmission-type light modulator is in a light state.
Figure 2:
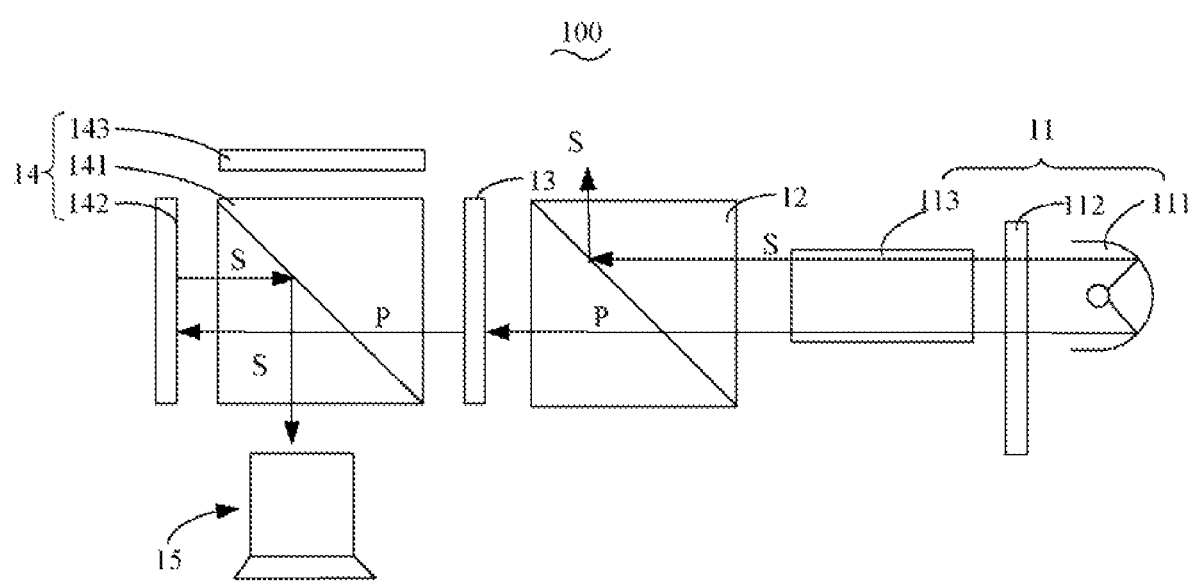
FIG. 2 is a schematic view of a configuration of the stereo projection optical system of FIG. 1, wherein the transmission-type light modulator is in a dark state.

Referring to FIG. 1 and FIG. 2, a stereo projection optical system 100 according to a first embodiment of the present invention is shown. The stereo projection optical system 100 includes a light source assembly 11, a first polarizing light splitter (PBS) 12, a transmission-type light modulator 13, an image assimilator 14 having a second polarizing light splitter 141 and a projecting lens 15.

The light source assembly 11 includes a light source 111, a color wheel 112 positioned to receive a light output of the light source 111 and a integrator 113 positioned to receive a light output of the color wheel 112. The light source 111 is configured for providing light beams for the stereo projection optical system 100 and can be a halogen lamp, a metal halogen lamp, a LED, and the like. In the present embodiment, the light source 111 is a halogen lamp that emits a white light. The color wheel 112 is configured for splitting the light beam output from the light source 111 into time-sequential red, green and blue light beams. The color wheel 112 includes red, green and blue color filters. A center portion of the color wheel 112 is connected to a motor (not shown) such that the color wheel 112 is rotated. The integrator 113 is configured for changing the light beam emitted from the light source 111 such that the light beam has a uniform spatial distribution.

The first PBS 12 is positioned to receive the light output from the light source assembly 11 and configured for splitting the non-polarized light beams into a first polarized light component and a second polarized light component which is substantially orthogonal to the first polarized light component. The first polarized light component can be S-polarized light or P-polarized light. When the first polarized light component is S-polarized light, the second polarized light component is P-polarized light. In the present embodiment, the first polarized light component is S-polarized light, and the second polarized light component is P-polarized light. The first polarized light component is reflected sideway by the first PBS 12 and the second polarized light component passes through the first PBS 12. The first PBS 12 can be a wire grid polarizer (WGP) or a polarizing beam splitter prism. In the present embodiment, the first PBS 12 is a polarizing beam splitter prism.

Figure 3:
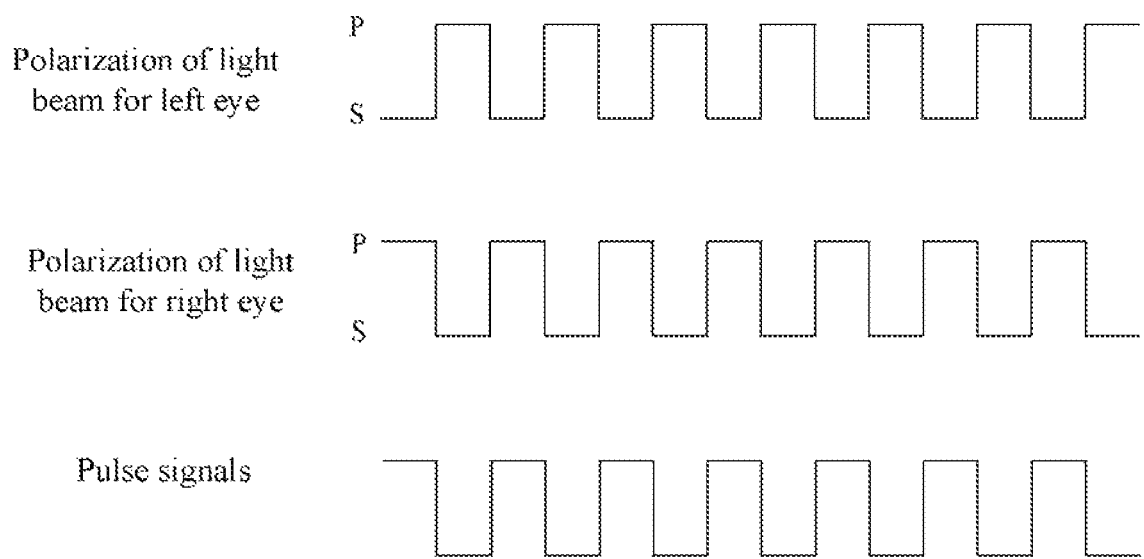
FIG. 3 shows wave diagrams of a pulse signal inputted into the transmission-type light modulator of FIG. 1 and polarizations of emergent light beams to form images for left and right eyes.

The transmission-type light modulator 13 can be a liquid crystal panel and is positioned to receive the first polarized light component form the first PBS 12. It can be understood that the transmission-type light modulator 13 can be also positioned to receive the second polarized light component. The transmission-type light modulator 13 can be a liquid crystal panel, and is controlled to turn on and off by pulse signals input into it. Referring to FIG. 3, wave diagram of the pulse signals input into the transmission-type light modulator 13 are shown. The transmission-type light modulator 13 switchably operates between a dark state and a bright state in turn under the control of the pulse signals and alternatively emits the first polarized light component and the second polarized light component to produce stereoscopic images for left and right eyes of viewer, as shown in FIG. 3. It should be noted that characteristic of the pulse signals can be adjusted according to need. When the transmission-type light modulator 13 is in bright state, as shown in FIG. 1, the first polarized light component directly passes through the transmission-type light modulator 13. Otherwise, when the light modulator 13 is in dark state, as shown in FIG. 2, the first polarized light component is converted into the second polarized light component, and the second polarized light component is emitted from the transmission-type light modulator 13.

The image assimilator 14 is positioned to receive the emergent light from the transmission-type light modulator 13 and also includes a first reflective spatial light modulator 141 and a second spatial light modulator 142 offset from one other along an optical path. The first, second reflective spatial light modulators 141, 142 can be a liquid crystal on silicon (LCoS). When the transmission-type light modulator 13 is in bright state, as shown in FIG. 1, the first polarized light component from the transmission-type light modulator 13 passes through the second PBS 141 and arriving at the first reflective spatial light modulator 142. The first reflective spatial light modulator 142 is configured for converting the first polarized light component into the second polarized light component and superimposing spatial information on the second polarized light component and emitting the second polarized light component. It can be understood that when the transmission-type light modulator 13 is in dark state, as shown in FIG. 2, the second reflective spatial light modulator 143 converts the second polarized light component from the transmission-type light modulator 13 into the first polarized light component, and superimposes spatial information on the first polarized light component, and emits the first polarized light component.

Figure 4:
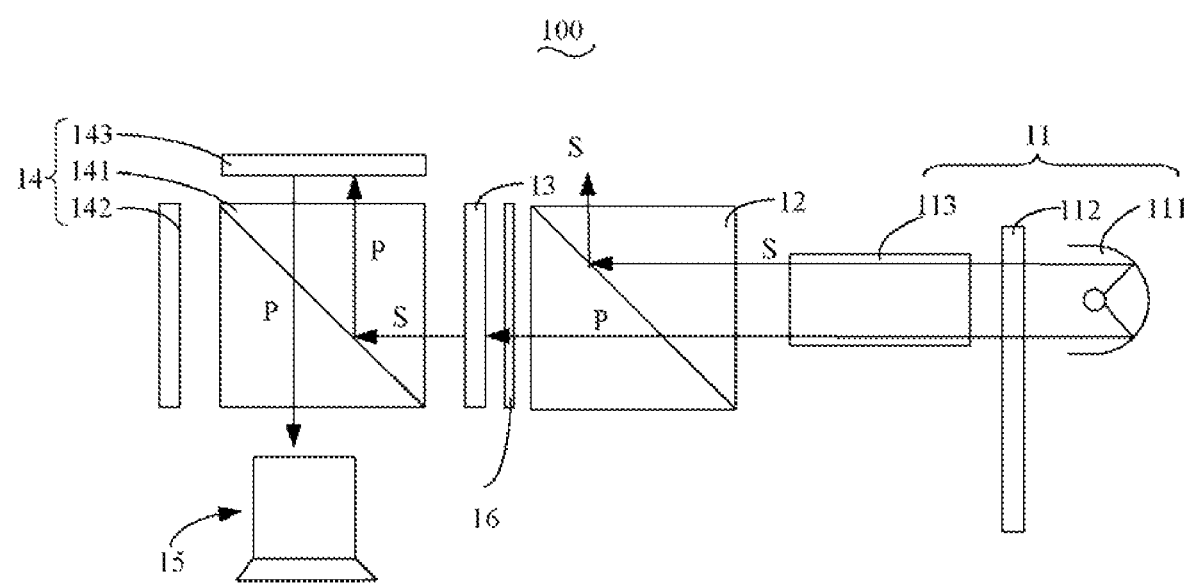
FIG. 4 is similar to FIG. 1, but further illustrates an analyzer disposed in the stereo projection optical system.

It should be understood that the stereo projection optical system 100 can also include an analyzer 16 in order to promote contrast of images projected by the stereo projection optical system 100. Referring to FIG. 4, this shows an analyzer 16 incorporated in a stereo projection optical system 100'. The analyzer 16 can be a polarizer, which is configured for transmitting light of a predetermined polarization direction and removing light of other polarization direction depending on the characteristics of the analyzer 16. In the present embodiment, the analyzer 16 transmit P-polarized light and remove S-polarized light. And the analyzer 16 is disposed between the first PBS 12 and the transmission-type light modulator 13.

The projecting lens 15 is positioned to receive the first, second polarized light component emitted from the image assimilator 14 and configured for magnifying and projecting an image formed by the light output of the image assimilator 14 on a screen (not shown).

Figure 5:
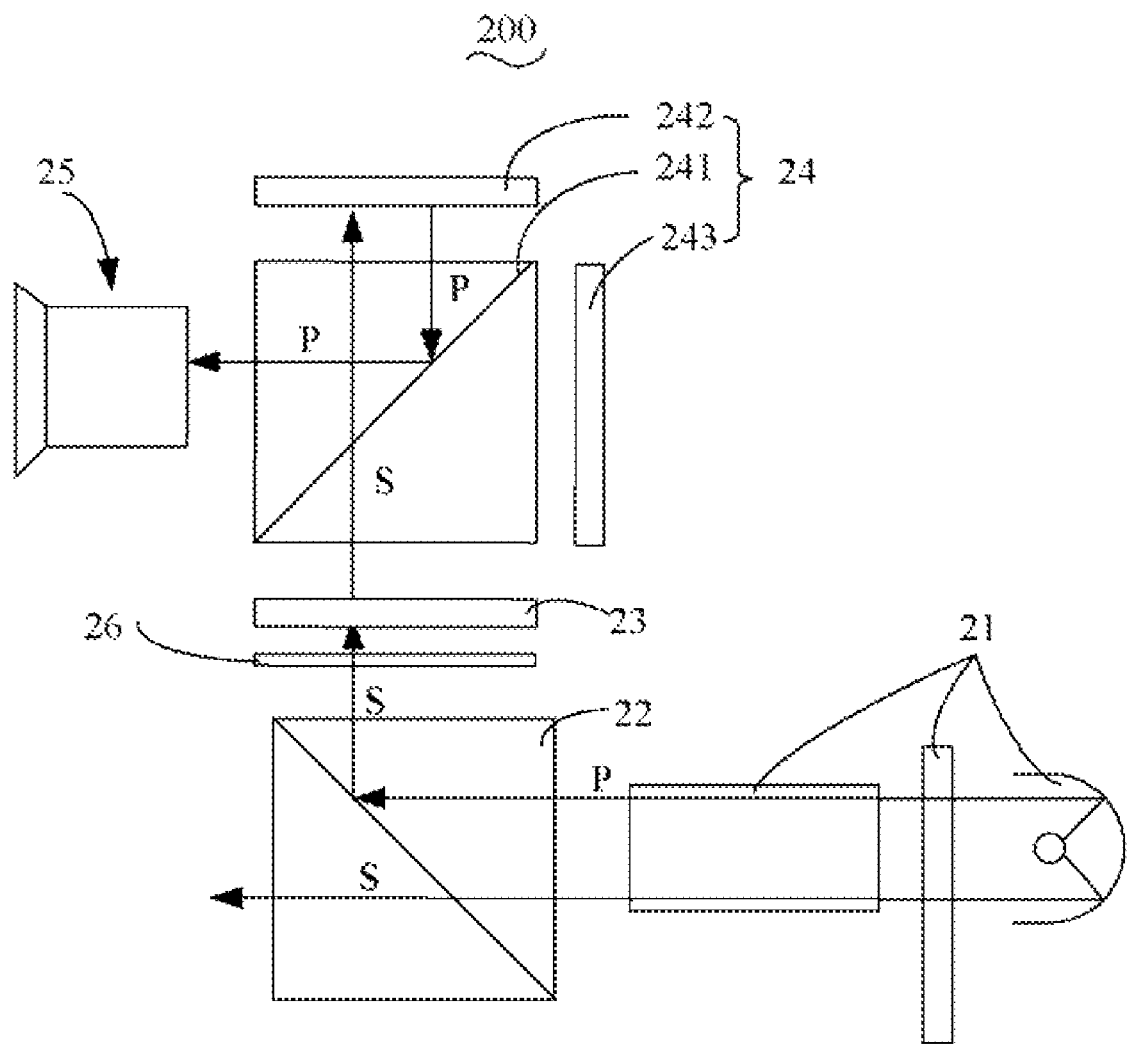
FIG. 5 illustrates a configuration of a stereo projection optical system in accordance with a second embodiment of the present invention.
Figure 6:
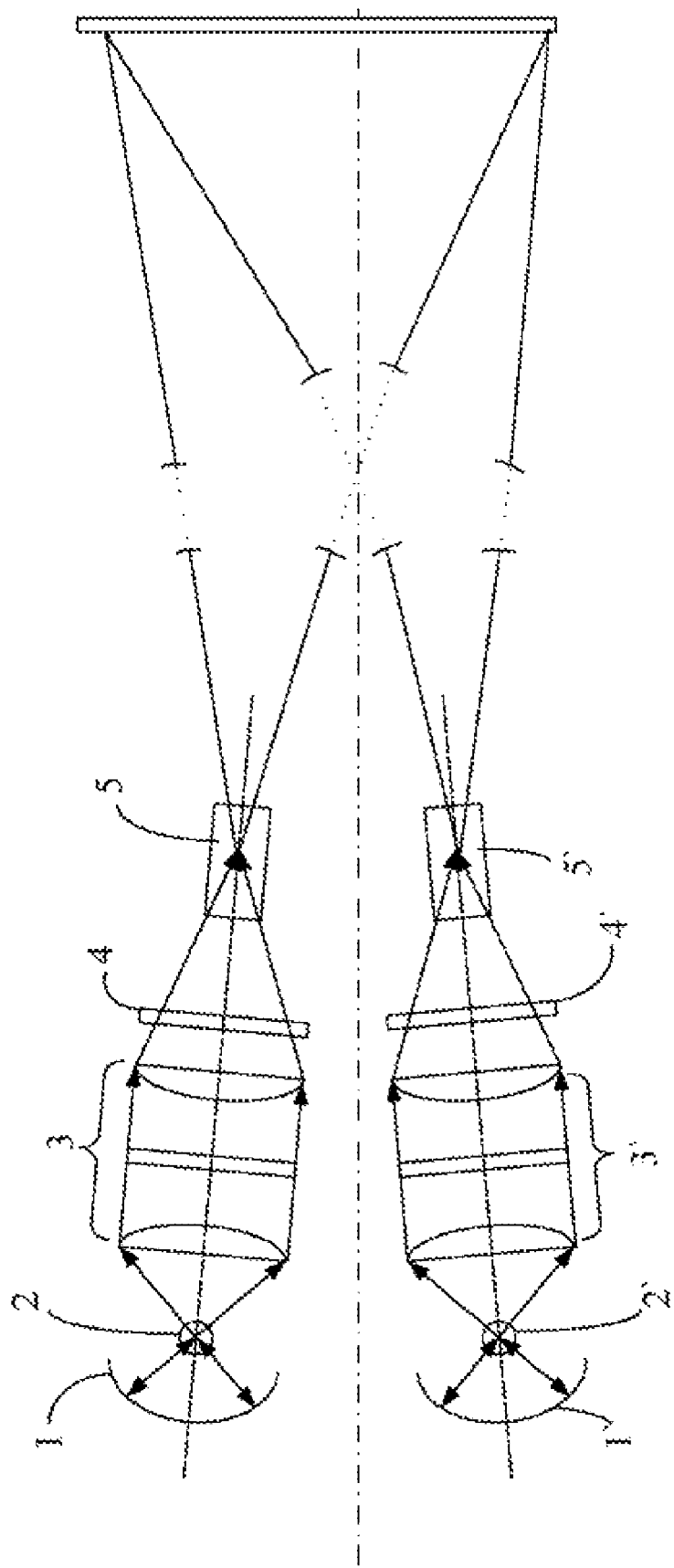
FIG. 6 illustrates a configuration of a conventional stereoscopic projection optical system.

Referring to FIG. 5, a stereo projection optical system 200 according to a second embodiment of the present invention is shown. The stereo projection optical system 200 includes a light source assembly 21, a first PBS 22, a transmission-type light modulator 23, an image assimilator 24 having a second PBS 241 and a projecting lens 25 offset from one other along an optical path.

Similar to the first embodiment, the image assimilator 24 also includes a first reflective spatial light modulator 242 and a second reflective spatial light modulator 243. The difference between the first embodiment and the second embodiment is that the first, second PBSs 22, 241 transmit S-polarized light and reflect P-polarized light. Other optical elements and light paths in the stereo projection optical system 200 are substantially the same as in the first embodiment.

The stereo projection optical system 200 also includes an analyzers 26, in order to promote the contrast of the images projected by the stereo projection optical system 200. The location of the analyzers 26 in the stereo projection optical system 200 is substantially same as that of the first embodiment.

The stereo projection optical systems provide viewers three-dimensional images formed by two alternative polarization light beams whose polarizations are perpendicular to each other utilizing the transmission-type light modulators. As described above, the PBS splits an incident beam into two beams, and the two SLMs obtain image beams and generate corresponding image beams having spatial information. All the image beams having spatial information are simultaneously projected on a screen as a 3-D image via a transmissive-type light modulator. The efficiency of light utilization is high and with little power loss is of light compared to the conventional systems.

It should be understood that the above-described embodiment are intended to illustrate rather than limit the invention. Variations may be made to the embodiments without departing from the spirit of the invention. Accordingly, it is appropriate that the appended claims be construed broadly and in a manner consistent with the scope of the invention.

What is claimed is:

1. A stereo projection optical system, comprising:

a first polarizing beam splitter configured for splitting an incident light beam into a first polarized light component and a second polarized light component which is substantially orthogonal to the first polarized light component;

a transmission-type light modulator positioned to receive the first polarized light component of the first polarizing light splitter, the transmission-type light modulator switchably operating between a dark state and a bright state in turn, wherein in the dark state, the transmission-type light modulator directly transmits the first polarized component, and in the bright state, the transmission-type light modulator converts the first polarized light component into the second polarized light component and emitting the second polarized light component;

an image assimilator positioned to receive an emergent light of the transmission-type light modulator and comprising a second polarized light splitter, a first reflective spatial light modulator, and a second reflective spatial light modulator, wherein the first polarized light component output from the transmission-type light modulator in the bright state passes through the second polarizing beam splitter and reaches the first reflective spatial light modulator, the first reflective spatial light modulator converts the first polarized light component into the second polarized light component and superimposes spatial information on the second polarized light component and emits the second polarized light component, and wherein the second polarized light component output from the transmission-type light modulator in the dark state passes through the second polarizing beam splitter and reaches the second reflective spatial light modulator, the second reflective spatial light modulators converts the second polarized light component into the first polarized light component and superimposes spatial information on the first polarized light component and emits the first polarized light component.

2. The stereo projection optical system as claimed in claim 1, wherein the transmission-type light modulator is a liquid crystal panel.

3. The stereo projection optical system as claimed in claim 1, wherein the first, second polarizing beam splitter is a wire grid polarizer.

4. The stereo projection optical system as claimed in claim 1, wherein the first, second polarizing beam splitter is a polarizing beam splitter prism.

5. The stereo projection optical system as claimed in claim 1, wherein the first, second reflective spatial light modulators are a liquid crystal on silicon.

6. The stereo projection optical system as claimed in claim 1, wherein the first polarized light component is one of S-polarized light and P-polarized light.

7. The stereo projection optical system as claimed in claim 6, wherein the second polarized light component is S-polarized light and the first polarized light component is P-polarized light.

8. The stereo projection optical system as claimed in claim 1, further comprising a projecting lens positioned to receive the light emerging form the image assimilator and configured for magnifying and projecting an image.

9. The stereo projection optical system as claimed in claim 1, further comprising an analyzer disposed between the first polarizing beam splitter and the transmission-type light modulator.

10. The stereo projection optical system as claimed in claim 9, wherein the analyzer is a polarizer.

* * * * *